US012561357B2

(12) United States Patent
Yuin et al.

(10) Patent No.: US 12,561,357 B2
(45) Date of Patent: Feb. 24, 2026

(54) DOCUMENT PROCESSING METHOD AND APPARATUS, DEVICE, AND MEDIUM

(71) Applicant: BEIJING ZITIAO NETWORK TECHNOLOGY CO., LTD., Beijing (CN)

(72) Inventors: Angeline Lim Sze Yuin, Beijing (CN); Guangping Xie, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 174 days.

(21) Appl. No.: 18/548,673

(22) PCT Filed: Mar. 1, 2022

(86) PCT No.: PCT/CN2022/078515
§ 371 (c)(1),
(2) Date: Sep. 1, 2023

(87) PCT Pub. No.: WO2022/184034
PCT Pub. Date: Sep. 9, 2022

(65) Prior Publication Data
US 2024/0160650 A1 May 16, 2024

(30) Foreign Application Priority Data
Mar. 1, 2021    (CN) .......................... 202110227783.7

(51) Int. Cl.
*G06F 16/338* (2019.01)
*G06F 16/3331* (2025.01)
*G06F 40/166* (2020.01)

(52) U.S. Cl.
CPC ........ *G06F 16/338* (2019.01); *G06F 16/3331* (2019.01); *G06F 40/166* (2020.01)

(58) Field of Classification Search
CPC ..................................................... G06F 16/388
See application file for complete search history.

(56) References Cited

U.S. PATENT DOCUMENTS

| 5,950,194 | A | * | 9/1999 | Bennett et al. | ......... G06F 17/30 |
| 7,996,393 | B1 | * | 8/2011 | Nanno et al. | ............. G06F 7/00 |

(Continued)

FOREIGN PATENT DOCUMENTS

| CN | 101004737 A | 7/2007 |
| CN | 103294693 A | 9/2013 |

(Continued)

OTHER PUBLICATIONS

Hu et al., "Keyword Extraction Based on Lexical Chains for Chinese News Web Pages", PR & AI, vol. 23, No. 1, Feb. 2010, pp. 45-51, with English abstract.

(Continued)

*Primary Examiner* — James J Debrow
(74) *Attorney, Agent, or Firm* — Astute IP Law Group

(57) ABSTRACT
A document processing method, apparatus, and device, and a medium are provided. The method comprises: in response to an operation performed by a user on a current document, extracting a keyword from document content of the current document; determining associated information corresponding to the keyword by performing searching in a preset database based on the keyword; and displaying prompt information, wherein the prompt information is configured to indicate information related to the associated information.

18 Claims, 3 Drawing Sheets

In response to an operation performed by a user on a current document, extracting a keyword from document content of the current document — S11

Determining associated information corresponding to the keyword by performing searching in a preset database based on the keyword — S12

Displaying prompt information, wherein the prompt information is configured to indicate information related to the associated information — S13

(56)　　　　References Cited

U.S. PATENT DOCUMENTS

| | | | |
|---|---|---|---|
| 10,650,086 B1 * | 5/2020 | Knudson et al. ... | G06F 17/2235 |
| 2001/0018685 A1 * | 8/2001 | Saito et al. ............. | G06F 17/30 |
| 2016/0320950 A1 * | 11/2016 | Kang et al. ......... | G06F 3/04842 |

FOREIGN PATENT DOCUMENTS

| CN | 104699836 A | 6/2015 |
|---|---|---|
| CN | 105005562 A | 10/2015 |
| CN | 107506343 A | 12/2017 |
| CN | 109144954 A | 1/2019 |
| CN | 109190050 A | 1/2019 |
| CN | 110659402 A | 1/2020 |
| CN | 111310421 A | 6/2020 |
| CN | 112163102 A | 1/2021 |
| CN | 112328853 A | 2/2021 |
| WO | 2015118619 A1 | 8/2015 |
| WO | 2020005654 A1 | 1/2020 |

OTHER PUBLICATIONS

Notice of Allowance issued in Chinese Patent Application No. 202110227783.7, Feb. 5, 2024, with English translation (7 pages).

International Search Report (with English translation) and Written Opinion issued in PCT/CN2022/078214, dated May 12, 2022, 18 pages provided.

Keyword Extraction Method Based on Density Clustering for Chinese News Web Pages, Yin Qian Hu Xue-gang. Xie Fei Wu Xin-dong, Journal of Guangxi Normal University Natural Science Edition, dated Mar. 2009, 4 pages, vol. 27, No. 1.

* cited by examiner

DOCUMENT PROCESSING METHOD AND APPARATUS, DEVICE, AND MEDIUM

This application is the national phase of International Patent Application No. PCT/CN2022/078515 filed on Mar. 1, 2022, which claims priority to Chinese Patent Application No. 202110227783.7, titled "DOCUMENT PROCESSING METHOD AND APPARATUS, DEVICE, AND MEDIUM", filed on Mar. 1, 2021 with the China National Intellectual Property Administration, both of which are incorporated herein by reference in their entireties.

FIELD

The present disclosure relates to information processing technology, in particular to a method, apparatus and device for document processing and a medium.

BACKGROUND

In documents, some words may have associated information, which includes the documents or reference objects associated with the words and is used to clearly explain the meaning of the words and facilitate subsequent knowledge dissemination and alignment.

In the document editing process, since it is difficult for the user to know by memory whether there is associated information for all the words, it is impossible to acquire the associated information of the words. Furthermore, even if the associated information were acquired, the associated information could only be viewed but no operations can be performed on the associated information.

SUMMARY

A method, apparatus and device for document processing and a medium are provided according to the embodiments of the present disclosure, which processes associated information of words in a document effectively.

In a first aspect, a method for document processing is provided according to the present disclosure. The method includes:

in response to an operation performed by a user on a current document, extracting a keyword from document content of the current document;

determining associated information corresponding to the keyword by performing searching in a preset database based on the keyword; and displaying prompt information, where the prompt information is configured to indicate information related to the associated information.

In a second aspect, an apparatus for document processing is further provided according to the present disclosure. The apparatus includes:

a keyword extraction module, configured to extract a keyword from document content of a current document in response to an operation performed by a user on the current document;

an associated information determination module, configured to determine associated information corresponding to the keyword by performing searching in a preset database based on the keyword; and a prompt information display module, configured to display prompt information, where the prompt information is configured to indicate information related to the associated information.

In a third aspect, a device for document processing is further provided according to the present disclosure. The device for document processing includes:

one or more processors; and a memory, configured to store one or more programs;

where, the one or more programs, when executed by the one or more processors, cause the one or more processors to implement the method for document processing according to any one of the embodiments of the present disclosure.

In a fourth aspect, a medium is further provided according to the present disclosure. The medium storing a computer program thereon, where the computer program, when executed by a processor, implements the method for document processing according to any one of the embodiments of the present disclosure.

According to the embodiments of the present disclosure, a method, apparatus and device for document processing and a medium are provided. The method for document processing includes extracting, in response to an operation performed by a user on a current document, a keyword from document content in the current document; determining associated information corresponding to the keyword by performing searching in a preset database based on the keyword; and displaying prompt information, where the prompt information is configured to indicate information related to the associated information. In the embodiments of the present disclosure, during the process of editing an online document, the associated information corresponding to the keyword is automatically searched, and prompt information is displayed, so that the user can perform related operations on the associated information according to the prompt information.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals represent the same or similar elements through the drawings. It should be understood that the drawings are schematic and the components and elements are unnecessarily drawn to scale.

DETAILED DESCRIPTION OF EMBODIMENTS

Figure 1:
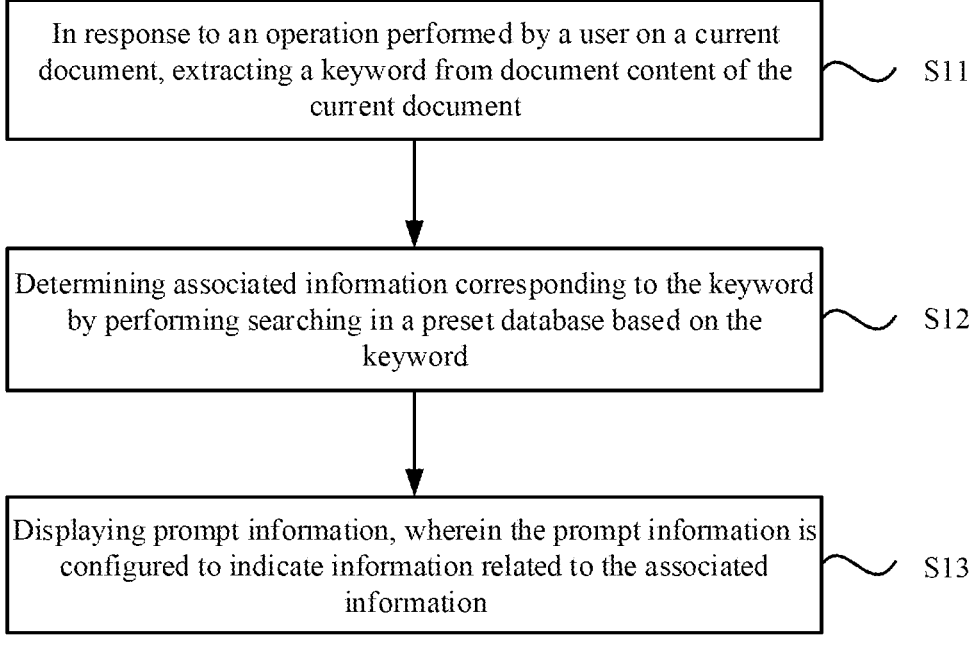
FIG. 1 is a flowchart of a method for document processing according to an embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments described herein. Rather, the embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or a step shown herein may be omitted. The scope of the present disclosure is not limited in this aspect.

The term "include" and its variations in the present disclosure means open-ended inclusion, i.e., "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first" and "second" used in the present disclosure are used to distinguish different apparatuses, modules or units, and are not used to limit a sequential order or interdependence of the functions performed by the apparatuses, modules or units.

It should be noted that the wordings such as "one" and "multiple" used in the present disclosure are illustrative and not restrictive. Those skilled in the art should understand that the wordings should be understood as "one or more" unless otherwise expressly indicated in the context.

The names of messages or information exchanged between multiple apparatuses in the embodiments of the present disclosure are only for illustrative purposes, and are not intended to limit the scope of the messages or information.

FIG. 1 illustrates a flowchart of a method for document processing according to an embodiment of the present disclosure. This embodiment is applicable to the case where operations are performed on one or more words and associated information thereof in a document. The method can be implemented by an apparatus for document processing. The apparatus may be realized by means of software and/or hardware.

It should be noted that the method for document processing provided in this embodiment may be used on computer device, and may be considered to be implemented by the apparatus for document processing integrated in the computer device. The computer device may specifically include a processor, a memory, input apparatus, and output apparatus. For example, the computer device may be a notebook computer, desktop computer, tablet computer and smart terminal.

As shown in FIG. 1, the method for document processing, provided by this embodiment, mainly includes steps S11, S12 and S13 as follows.

In S11, in response to an operation performed by a user on a current document, a keyword is extracted from document content.

The current document may be an editable document displayed in the display area of the output apparatus of the computer device, for example, a word document, an excel document, a pdf document, a txt document and the like. Document content refers to the editable content in the current document, such as text, pictures, videos, audios and other content. This embodiment only illustrates the current document, document content, keywords, etc., rather than limiting them. The document content is the document content of the current document.

It should be noted that the keywords in this disclosure may be text words in the current document, or may be contents such as pictures, videos, and audios in the document. The keywords are not limited to only text words herein.

Further, the operation performed by the user on the current document refers to the operation performed by the user on the current document page. The operation may be inputting operation or other editing operations, such as modifying the format in the document. Specifically, the inputting operation may be inputted by the user through pasting, or may be input by the user through an input method. In this embodiment, the operation is only described as an example rather than a limitation.

Further, when the current document is an article that has been edited or is being edited, keywords in the current document are extracted using artificial intelligence (AI) algorithm capabilities. The keywords include keywords that already exist in the Workspace, or words that are likely keywords of the article through algorithm analysis.

Specifically, when the operation performed by the user on the current document is an inputting operation, the content inputted by the user may be identified along with the inputting operation performed by the user, and the inputted words may be used as keywords.

In this embodiment, it is not to take every character in the current document as a keyword, but it is to extract the keyword from the document content, which can reduce the number of subsequent searches for keywords.

Specifically, the keyword extraction may be performed by a term frequency-inverse document frequency (TF-IDF) algorithm, a TextRank algorithm, or a word2vec (word to vector) algorithm. It should be noted that the implementation of the keyword extraction in this embodiment is only an illustration rather than a limitation.

In S12, associated information corresponding to the keyword is determined by performing searching in a preset database based on the keyword.

In this embodiment, the preset database stores keywords and their corresponding associated information. The associated information is information related to the keyword and is used to clearly explain the meaning of the word or explain information such as the source of the keyword. The associated information may be a document or a reference object.

Further, the search may be performed by fuzzy matching or exact matching.

Specifically, the exact matching with the keyword may be performed in the preset database, or fuzzy matching may be performed in the preset database through the keyword.

Further, a combination of fuzzy matching and exact matching may be used for searching. The exact matching can increase the speed of query, while the fuzzy searching can improve the recall rate of query.

In S13, prompt information is displayed, where the prompt information is used to indicate information related to the associated information.

In this embodiment, the prompt information is displayed in a manner different from that of other regular content in the document content, or a dedicated prompt button or prompt area may be provided. The prompt information may be used to prompt the user that there is associated information corresponding to the keyword. It may be used to indicate information related to associated information corresponding to the keyword.

In one embodiment, the displaying the prompt information includes: in response to a current editing mode being a first mode, switching a display mode of the keyword from the first mode to a second mode.

In this embodiment, the first mode can be understood as a display mode of regular content in the current document. The second mode refers to a dedicated display mode for the keywords of which the associated information can be found in the preset database.

For example, the first display mode is a font of SimSun with a size of four. The second display mode may be adding an underline, adding a text background, bold, italic, or the like.

In another embodiment, the displaying the prompt information includes: in response to a current editing mode being a third mode, switching the display mode of the keyword from the third mode to a second mode associated with the third mode.

In this embodiment, the third mode can be understood as a display mode for regular content in the current document. The second mode refers to a dedicated display mode for the keywords of which associated information can be found in the preset database.

It should be noted that the difference between the third display mode and the first display mode is that the first mode is only a basic display of document content, while the third display mode adds other display manners on the basis of the basic display. The second display mode associated with the third mode is to add other display manners on the basis of the third mode.

For example, the first display mode is a font of SimSun with a size of four. The third pattern is a font of SimSun with a size of four, in bold. Correspondingly, the second display mode associated with the third mode is a font of SimSun with a size of four, in bold and underlined. Or the second display mode associated with the third mode is a font of SimSun with a size of four, in bold, adding text background.

The purpose of distinguishing the display mode of the keyword from the display mode of the regular content in the document is to remind the user that the keyword has associated information in the preset database and related operations can be performed on the associated information.

Further, in a case that the search is performed in the preset database based on the keyword and no associated information corresponding to the keyword is found, then the keyword is taken as the regular content in the document with no prompt information displayed.

In one embodiment, the displaying the prompt information includes: displaying a preview button for the associated information.

In this embodiment, the preview button may be an operation button visible to the user, or an invisible triggering interface. Specifically, an invisible triggering interface may be set on a keyword. For example, when the user double-clicks the invisible triggering interface, or the mouse moves over the invisible triggering interface, the preview operation is triggered, and the keyword, associated information corresponding to the keyword and operation prompt related to the associated information are displayed.

By operating the preview button, keywords, associated information corresponding to the keywords, and operation prompt related to the associated information can be displayed.

According to the embodiments of the present disclosure, the method for document processing includes: extracting, in response to an operation performed by a user on a current document, a keyword from document content; determining associated information corresponding to the keyword by performing searching in a preset database based on the keyword; and displaying prompt information, where the prompt information is configured to indicate information related to the associated information. In the embodiment of the present disclosure, during the process of editing an online document, the associated information corresponding to the keyword is automatically searched, and prompt information is displayed, so that the user can perform related operations on the associated information according to the prompt information.

On the basis of the above-mentioned embodiments, the embodiment of the present disclosure further optimizes the method for document processing. The optimized method for document processing includes: extracting a keyword from document content, in response to an operation performed by a user on a current document; determining associated information corresponding to the keyword by performing searching in a preset database based on the keyword; displaying prompt information, where the prompt information is configured to indicate information related to the associated information; and displaying a first area in response to an operation on the prompt information, where the first area includes the keyword, associated information corresponding to the keyword, and an operation prompt related to the associated information.

In this embodiment, the first area is a sub-area displayed in the current display area, which may be a floating layer panel floating in the current document, or a display area outside the display area of the current document, may be displayed in the left, right or bottom of the current document. In this embodiment, the display position of the first area is only an illustration rather than a limitation.

Figure 2:
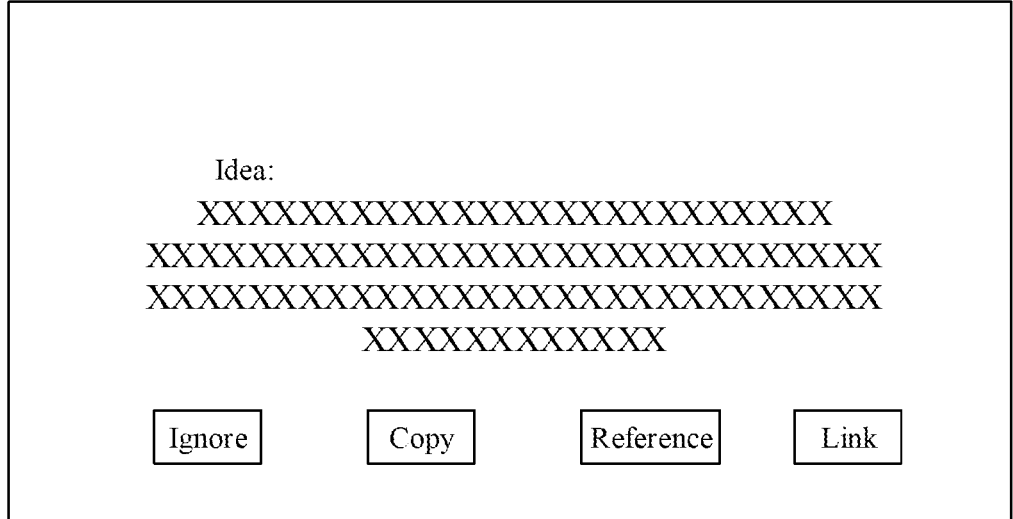
FIG. 2 is a schematic diagram of a first area according to an embodiment of the present disclosure.

FIG. 2 is a schematic diagram of a first area according to an embodiment of the present disclosure. As shown in FIG. 2, the first area includes a keyword, associated information corresponding to the keyword, and operation prompts related to the associated information. An exemplary keyword "idea" is illustrated in FIG. 2. Operation prompts related to the associated information include "ignore", "copy", "reference", "link", etc.

In this embodiment, the display mode of the keyword in the first area is a fourth mode, and the display mode of the associated information corresponding to the keyword in the first area is a fifth mode.

Specifically, the fourth mode refers to a display mode of the keyword in the first area, and the fifth mode is a display mode of associated information corresponding to the keyword in the first area. The fourth mode and the fifth mode may be the same or may be different from each other. Optionally, the fourth mode and the fifth mode are different display modes. Further, the fourth mode is a special display with respect to the fifth mode. For example, the fourth mode additionally includes displaying in bold on the basis of the fifth mode or may have increased font size on the basis of the fifth mode. In this way, the user can distinguish between keywords and associated fast.

In one embodiment, after displaying the first area, the method further includes: closing the first area in response to a first operation performed by the user on the first area.

Further, once the user performs the first operation on the first area, it indicates that the user does not need to view the associated information corresponding to the keyword. In this case, closing first display area can make the page display of the current document tidy and avoid redundant page display.

In one embodiment, the first operation on the first area may be a triggering operation performed by the user on the ignore button in the first area. The triggering operation may be operation such as single click or double click, which is not limited in this embodiment.

In another embodiment, no ignore button is set in the first area. When no ignore button is set in the first area, it is to respond to the first operation performed by the user on the first area once detecting that the cursor leaves the first area, that is, when the cursor is located outside the first area.

In one embodiment, after displaying the first area, the method further includes: establishing a link between the keyword and the associated information in response to a second operation performed by the user on the first area.

Further, the second operation performed by the user on the first area indicates that the user currently needs to establish a link relationship between the keyword and associated information. After establishing the link between the keyword and the associated information, a display entry that triggers the associated information may be set on the keyword. When the user triggers the display entry of the associated information on the keyword, the content of the associated information may be displayed through the preview window, etc. In this way, during the subsequent use of the current document, the associated information corresponding to the keyword can be found conveniently.

Further, the link relationship may be a link-type link, or a hover-type link, etc., which is not limited in this embodiment.

In one embodiment, after displaying the first area, the method further includes: in response to a third operation performed by the user on the first area, inserting the associated information corresponding to the keyword into the current document as edit content.

In this embodiment, the third operation on the first area may be a triggering operation performed by the user on an insert button in the first area. The triggering operation may be the operation such as a single click or double click, which is not limited in this embodiment.

In one embodiment, after displaying the first area, the method further includes: in response to a fourth operation performed by the user on the first area, copying the associated information corresponding to the keyword.

In this embodiment, the fourth operation performed by the user on the first area may be a triggering operation performed by the user on a copy button in the first area. The triggering operation may be the operation such as a single click or double click, which is not limited in this embodiment.

Copying the associated information corresponding to the keyword refers to copying the associated information onto the clipboard. Copying the associated information may be to copy all the associated information, or to copy a part of the associated information as selected.

In one embodiment, the method for document processing further includes: in a case that no associated information corresponding to the keyword is searched out, creating and editing an associated document in response to an operation performed by the user; and determining the associated document as the associated information corresponding to the keyword.

In this embodiment, in a case that no associated information corresponding to the keyword is found, it indicates that there is no associated information for the keyword in the preset database. At this point, the user may create an associated document corresponding to the keyword. In response to the operation of the user, document content inputted by the user is acquired, and the inputted document content is determined as the associated information corresponding to the keyword. In other words, the association relationship between the keyword and the created associated document is established, and the association relationship and the associated document are saved in the preset database.

Specifically, in a case that no associated information corresponding to the keyword is found, a new document is created in response to the input operation of the user, and the document is edited. After editing is completed, the content of the document is used as the associated information of the keyword.

In one embodiment, the displaying the prompt information includes: displaying information of the associated document, where the information of the associated document includes at least one of a document title, document content and a document identifier.

In one embodiment, the method for document processing further includes: determining an association relationship between the current document and a target document based on the keyword, where the target document is a document including the keyword.

In this embodiment, the keyword extracted in step S11 is used as a tag of the current document, and the tag may be used as the basis for the association relationship between documents. In other words, the association relationship may be established between documents with the same keyword. In this way, it can be quickly determined in which documents the keyword has appeared, so as to learn about the specific meaning or information related to the keyword in more detail.

In one embodiment, the method for document processing further includes: in response to an operation on the keyword, presenting a second area, where the second area includes the association relationship between the current document and the target document presented in a form of a network map.

The operation on the keyword may be a click operation on the keyword, or a hover operation, which is not limited in this embodiment.

The association relationship between the current document and the target document indicates that the current document and the target document have the same associated word(s).

In this embodiment, the first area is a sub-area displayed in the current display area, which may be a floating layer panel floating in the current document, or a display area outside the display area of the current document, may be displayed in the left, right or bottom of the current document. In this embodiment, the display position of the second area is only an illustration rather than a limitation.

In one embodiment, the method for document processing further includes: in response to an operation on the keyword, presenting a third area, where the third area includes a list of target documents.

The operation on the keyword may be a click operation on the keyword, or a hover operation, which is not limited in this embodiment.

The list of target documents includes information of multiple target documents, and the information of the target documents may be the titles of the target documents, the content of the target documents, the latest edited time of the target documents, or the identifiers of the target documents and other information, which are not limited in this embodiment.

In this embodiment, the third area is a sub-area displayed in the current display area, which may be a floating layer panel floating in the current document, or a display area outside the current document display area, may be displayed in the left, right or bottom of the current document. In this embodiment, the display position of the third area is only an illustration rather than a limitation.

The information of the target documents in this embodiment may be the titles of the target document. In this way, the user can acquire relevant information of the target documents fast.

Figure 3:
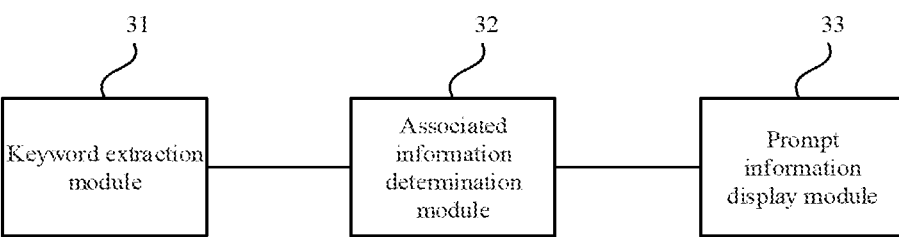
FIG. 3 is a schematic structural diagram of an apparatus for document processing according to an embodiment of the present disclosure.

FIG. 3 is a schematic structural diagram of an apparatus for document processing according to an embodiment of the present disclosure. This embodiment is applicable to the case where operations are performed words and associated information thereof in a document. The method can be implemented by an apparatus for document processing. The apparatus may be realized by means of software and/or hardware.

As shown in FIG. 3, the apparatus for document processing, provided in this embodiment, mainly includes a keyword extraction module 31, an associated information determination module 32, and a prompt information display module 33.

The keyword extraction module 31 is configured to extract a keyword from document content of a current document in response to an operation performed by a user on the current document.

The associated information determination module 32 is configured to determine associated information corresponding to the keyword by performing searching in a preset database based on the keyword.

The prompt information display module 33 is configured to display prompt information, where the prompt information is configured to indicate information related to the associated information.

In the apparatus for document processing provided by the embodiments of the present disclosure, the apparatus for document processing mainly implements the following operations: extracting a keyword from document content in response to an operation performed by a user on a current document; determining associated information corresponding to the keyword by performing searching in a preset database based on the keyword; and displaying prompt information, where the prompt information is configured to indicate information related to the associated information. In the embodiment of the present disclosure, during the process of editing an online document, the associated information corresponding to the keyword is automatically searched, and prompt information is displayed, so that the user can perform related operations on the associated information according to the prompt information.

In one embodiment, the prompt information display module 33 is configured to switch, in response to a current editing mode being a first mode, a display mode of the keyword from the first mode to a second mode; or switch, in response to the current editing mode being a third mode, the display mode of the keyword from the third mode to a second mode associated with the third mode.

In one embodiment, the prompt information display module 33 is configured to display prompt information, including: displaying a preview button for the associated information.

In one embodiment, the apparatus further includes an operation response module, configured to display a first area in response to an operation on the prompt information, where the first area includes the keyword, associated information corresponding to the keyword, and an operation prompt related to the associated information.

In one embodiment, the operation response module is configured to close the first area in response to the first operation performed by the user on the first area.

In one embodiment, the operation response module is configured to establish a link between the keyword and the associated information in response to a second operation performed by the user on the first area.

In one embodiment, the operation response module is configured to insert the associated information corresponding to the keyword into the current document as edit content in response to a third operation performed by the user on the first area.

In one embodiment, the operation response module is configured to copy the associated information corresponding to the keyword in response to a fourth operation performed by the user on the first area.

In one embodiment, the display mode of the keyword in the first area is a fourth mode, and the display mode of associated information corresponding to the keyword in the first area is a fifth mode.

In one embodiment, the operation response module is configured to create and edit an associated document in response to an operation performed by the user, in a case that no associated information corresponding to the keyword is searched out.

The associated information determination module is configured to determine the associated document as the associated information corresponding to the keyword.

In one embodiment, a display module is configured to display information of the associated document in the prompt information, where the information of the associated document includes at least one of a document title, document content and a document identifier.

In one embodiment, an association relationship determination module is configured to determine an association relationship between the current document and a target document based on the keyword, where the target document is a document including the keyword.

In one embodiment, the operation response module is configured to display a second area in response to an operation on the keyword, where the second area includes the association relationship between the current document and the target document presented in a form of a network map.

In one embodiment, the operation response module is configured to display a third area in response to an operation on the keyword, and the third area includes a list of target documents.

The apparatus for document processing can implement the method for document processing provided by any embodiments of the present disclosure, which has corresponding functional modules and beneficial effects for implementing the method.

Figure 4:
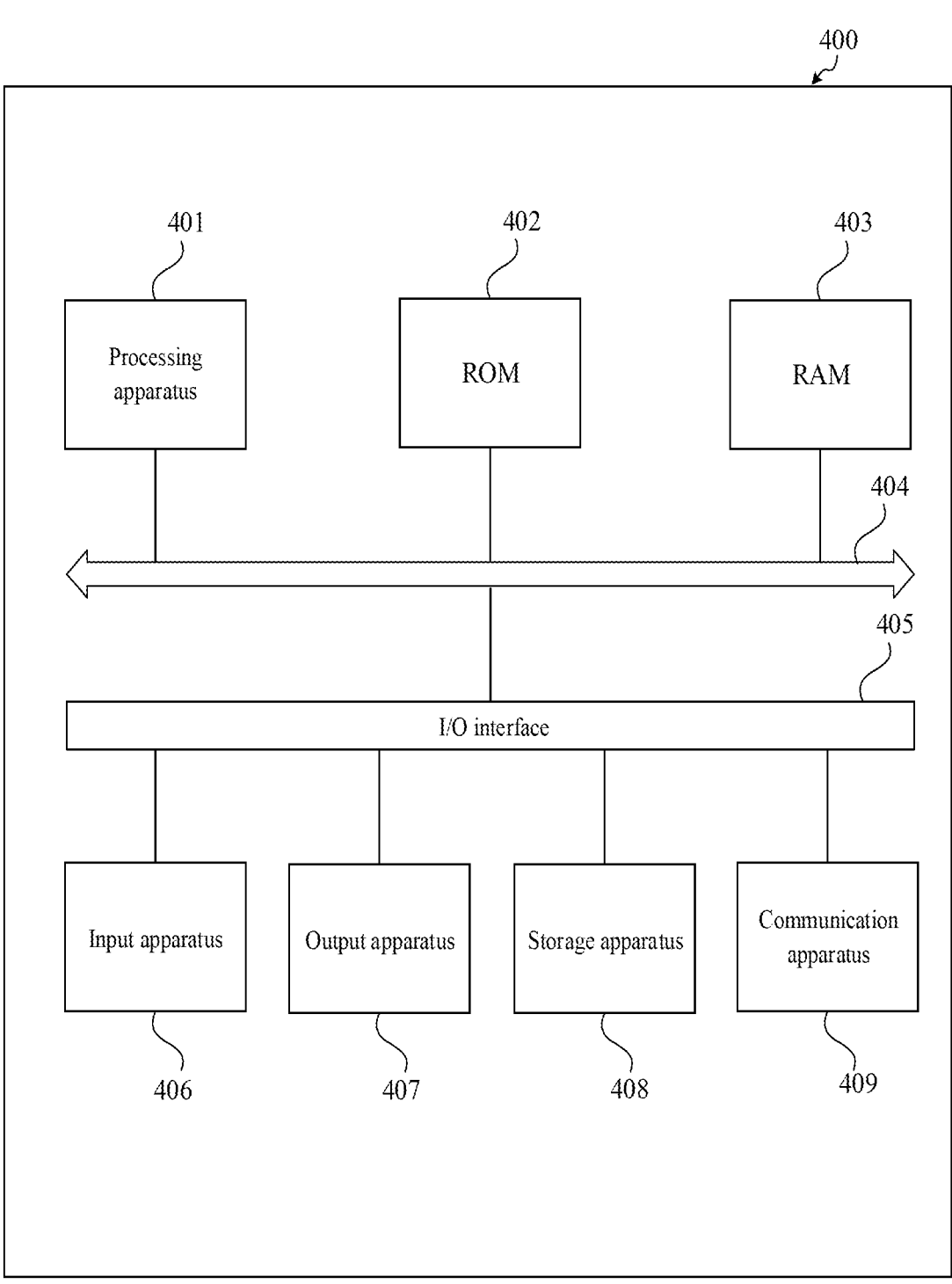
FIG. 4 is a structural diagram of a device for document processing according to an embodiment of the present disclosure.

Referring to FIG. 4, FIG. 4 illustrates a schematic structural diagram of an electronic device (e.g., a terminal device or server shown in FIG. 4) that is applicable to implement embodiments of the present disclosure. The terminal device in the embodiment of the present disclosure may include, but is not limited to, mobile terminals, such as mobile phones, laptops, digital broadcast receivers, personal digital assistants (PDAs), tablet computers (PADs), portable multimedia players (PMPs), vehicle-mounted terminals (such as in-vehicle navigation terminals) and the like, and stationary terminals such as digital TVs, desktop computers and the like. It should be noted that the electronic device shown in FIG. 4 is only an example and should not impose any limitations on the functions and scope of use of the embodiments of the present disclosure.

As shown in FIG. 4, the electronic device 400 for document processing may include a processing apparatus (such as a central processor and a graphic processor) 401. The processing apparatus 401 may perform various appropriate actions and processing based on programs stored in a read-only memory (ROM) 402 or programs uploaded from a storage apparatus 408 to a random access memory (RAM) 403. Various programs and data required for operations of the electronic device 400 are also stored in the RAM 403. The processing apparatus 401, the ROM 402 and the RAM 403 are connected to each other through the bus 404. An input/output (I/O) interface 405 is also connected to the bus 404.

Generally, the following apparatuses may be connected to the I/O interface 405: an input apparatus 406 such as a touch screen, a touch panel, a keyboard, a mouse, a camera, a microphone, an accelerometer, and gyroscope; an output apparatus 407 such as a liquid crystal display (LCD), a loudspeaker and a vibrator; a storage apparatus 408 such as a magnetic tape and a hard disk; and a communication apparatus 409. The communication apparatus 409 may allow the electronic device 400 to communicate with other device in a wired or wireless manner to exchange data. Although FIG. 4 illustrates the electronic device 400 provided with various apparatuses, it should be understood that not all shown apparatuses are required to be implemented or included. Alternatively, more or less apparatuses may be implemented or included.

Particularly, according to the embodiments of the present disclosure, the process described above in conjunction with flowcharts may be implemented as a computer software program. For example, a computer program product is further provided according to an embodiment of the present disclosure, including a computer program carried on a non-transitory computer readable medium. The computer program includes the program codes for implementing the methods as shown in the flowcharts. In the embodiment, the computer program may be downloaded and installed from the network via the communication apparatus 409, or installed from the storage apparatus 408, or installed from the ROM 402. When the computer program is executed by the processing apparatus 401, the functions defined in the methods according to the embodiments of the present disclosure are performed.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The more specific examples of the computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may be in a variety of forms, and include but not limited to an electromagnetic signal, an optical signal or any appropriate combination thereof. The computer readable signal medium may further be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

In some embodiments, the client and the server may perform communication by using any currently known network protocol such as Hyper Text Transfer Protocol (HTTP) or any network protocol to be developed in the further, and may connect with digital data communication (for example, a communication network) in any form or carried in any medium. Examples of the communication network include a local area network (LAN), a wide area network (WAN), Internet, and an end-to-end network (such as, ad hoc end-to-end network), and any currently known or future developed network.

The computer readable medium may be included in the electronic device or may stand alone without being assembled into the electronic device.

The computer readable medium carries one or more programs. The one or more programs, when executed by the electronic device, cause the electronic device to: extract a keyword from document content in response to an operation performed by a user on a current document; determine associated information corresponding to the keyword by performing searching in a preset database based on the keyword; and display prompt information, where the prompt information is used to indicate information related to the associated information.

In an embodiment of the present disclosure, computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams in the drawings illustrate architectures, functions and operations which may be implemented by the system, method and computer program product according to the embodiments of the present disclosure. Each block in the flowcharts or the block diagram may represent a module, a program segment or part of codes including executable instruction(s) for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or operations, or may be realized by a combination of dedicated hardware and computer instructions.

The units mentioned in the description of the embodiments of the present disclosure may be implemented by means of software or otherwise by means of hardware. A name of the units does not constitute a limitation to the units in some case.

The functions described above herein may be at least partially performed by one or more hardware logic components. For example, the hardware logic component may include but not limited to: a field programmable gate array (FPGA), an application specific integrated circuit (ASIC), an application specific standard product (ASSP), a system on chip (SOC), a complex programmable logic device (CPLD) and so on.

It the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any appropriate combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof.

According to one or more embodiments of the present disclosure, a method, apparatus and device for document processing and a medium are provided. The method includes as follows:

> extracting, in response to an operation performed by a user on a current document, a keyword from document content of the current document;
>
> determining associated information corresponding to the keyword by performing searching in a preset database based on the keyword; and
>
> displaying prompt information, where the prompt information is configured to indicate information related to the associated information.

According to one or more embodiments of the present disclosure, a method, apparatus and device for document processing and a medium are provided. The method includes:

> in response to a current editing mode being a first mode, switching a display mode of the keyword from the first mode to a second mode; or
>
> in response to the current editing mode being a third mode, switching the display mode of the keyword from the third mode to a second mode associated with the third mode.

According to one or more embodiments of the present disclosure, a method, apparatus and device for document processing and a medium are provided. The method includes:

> displaying a preview button for the associated information.

According to one or more embodiments of the present disclosure, a method, apparatus and device for document processing and a medium are provided. The method includes:

> after displaying the prompt information, the method further includes:
>
>> displaying a first area in response to an operation on the prompt information, where the first area includes the keyword, associated information corresponding to the keyword, and an operation prompt related to the associated information.

According to one or more embodiments of the present disclosure, a method, apparatus and device for document processing and a medium are provided. The method includes:

> after displaying the first area, the method further includes:
>
>> closing the first area in response to a first operation performed by the user on the first area.

According to one or more embodiments of the present disclosure, a method, apparatus and device for document processing and a medium are provided. The method includes:

> after displaying the first area, the method further includes:
>
>> in response to a second operation performed by the user on the first area, establishing a link between the keyword and the associated information.

According to one or more embodiments of the present disclosure, a method, apparatus and device for document processing and a medium are provided. The method includes:

> after displaying the first area, the method further includes:
>
>> in response to a third operation performed by the user on the first area, inserting the associated information corresponding to the keyword into the current document as edit content.

According to one or more embodiments of the present disclosure, a method, apparatus and device for document processing and a medium are provided. The method includes:

> after displaying the first area, the method further includes:
>
>> in response to a fourth operation performed by the user on the first area, copying the associated information corresponding to the keyword.

According to one or more embodiments of the present disclosure, a method, apparatus and device for document processing and a medium are provided. The display mode of the keyword in the first area is a fourth mode, and the display mode of the associated information corresponding to the keyword in the first area is a fifth mode.

According to one or more embodiments of the present disclosure, a method, apparatus and device for document processing and a medium are provided. The method further includes:

> in a case that no associated information corresponding to the keyword is searched out, creating and editing an associated document in response to an operation performed by the user;
>
> and determining the associated document as the associated information corresponding to the keyword.

According to one or more embodiments of the present disclosure, a method, apparatus and device for document processing and a medium are provided. The displaying the prompt information includes:

displaying the information of the associated document, where the information of the associated document includes at least one of a document title, document content and a document identifier.

According to one or more embodiments of the present disclosure, a method, apparatus and device for document processing and a medium are provided. The method further includes:

determining, based on the keyword, an association relationship between the current document and a target document, where the target document is a document including the keyword.

According to one or more embodiments of the present disclosure, a method, apparatus and device for document processing and a medium are provided. The method further includes:

presenting a second area in response to an operation on the keyword, where the second area includes the association relationship between the current document and the target document presented in a form of a network map.

According to one or more embodiments of the present disclosure, a method, apparatus and device for document processing and a medium are provided. The method further includes:

presenting a third area in response to an operation on the keyword, where the third area includes: a list of target documents.

The above description merely illustrates the preferred embodiments of the present disclosure and the technical principles employed. Those skilled in the art should understand that the scope of present disclosure is not limited to the technical solutions formed by certain combination of the above-mentioned technical features, and should also cover other technical solutions formed by any combination of the above-mentioned technical features and any equivalent features without departing from the disclosed concept. For example, a technical solution formed by replacing the features with the technical features disclosed in the present disclosure (but not limited to) with similar functions.

In addition, although the above operations are described in a specific order, it should not be understood that these operations are required to be performed in the specific order or performed in a sequential order. In some conditions, multitasking and parallel processing may be advantageous. Similarly, although multiple implementation details are included in the above descriptions, the details should not be interpreted as limitations to the scope of the present disclosure. Some features described in the context of an individual embodiment may be implemented in combination in an individual embodiment. Otherwise, the features described in the context of an individual embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. Rather, the specific features and actions described above are only examples of the implementation of the claims.

The invention claimed is:

1. A method for document processing, comprising:
in response to an operation performed by a user on a current document, extracting a keyword from document content of the current document;
determining associated information corresponding to the keyword by performing searching in a preset database based on the keyword; and
displaying prompt information, wherein the prompt information is configured to indicate information related to the associated information,
wherein the method further comprises:
creating and editing an associated document in response to an operation performed by the user, when no associated information corresponding to the keyword is searched out in the preset database; and
determining the associated document as the associated information corresponding to the keyword.

2. The method according to claim 1, wherein the displaying prompt information comprises:
in response to a current editing mode being a first mode, switching a display mode of the keyword from the first mode to a second mode; or
in response to the current editing mode being a third mode, switching the display mode of the keyword from the third mode to a second mode associated with the third mode.

3. The method according to claim 1, wherein after displaying the prompt information, the method further comprises:
displaying a first area in response to an operation on the prompt information, wherein the first area comprises the keyword, the associated information corresponding to the keyword, and an operation prompt related to the associated information.

4. The method according to claim 3, further comprising:
in response to a second operation performed by the user on the first area, establishing a link between the keyword and the associated information.

5. The method according to claim 3, further comprising:
in response to a third operation performed by the user on the first area, inserting the associated information corresponding to the keyword into the current document as edit content.

6. The method according to claim 3, further comprising:
in response to a fourth operation performed by the user on the first area, copying the associated information corresponding to the keyword.

7. The method according to claim 3, wherein the display mode of the keyword in the first area is a fourth mode, and the display mode of the associated information corresponding to the keyword in the first area is a fifth mode.

8. The method according to claim 1, wherein the displaying the prompt information comprises:
displaying the information of the associated document, wherein the information of the associated document comprises at least one of a document title, document content and a document identifier.

9. The method according to claim 1, further comprising:
determining, based on the keyword, an association relationship between the current document and a target document, wherein the target document is a document comprising the keyword.

10. The method according to claim 9, further comprising:
presenting a second area in response to an operation on the keyword, wherein the second area comprises the association relationship between the current document and the target document presented in a form of a network map.

11. The method according to claim 9, further comprising:

presenting a third area in response to an operation on the keyword, wherein the third area comprises a list of target documents.

12. A device for document processing, comprising:

one or more processors; and a memory, configured to store one or more programs;

wherein, the one or more programs, when executed by the one or more processors, cause the one or more processors to implement:

in response to an operation performed by a user on a current document, extracting a keyword from document content of the current document;

determining associated information corresponding to the keyword by performing searching in a preset database based on the keyword; and displaying prompt information, wherein the prompt information is configured to indicate information related to the associated information, wherein the one or more programs, when executed by the one or more processors, cause the one or more processors to implement:

creating and editing an associated document in response to an operation performed by the user, when no associated information corresponding to the keyword is searched out in the preset database; and determining the associated document as the associated information corresponding to the keyword.

13. The device according to claim 12, wherein the one or more processors are further cause to implement:

in response to a current editing mode being a first mode, switching a display mode of the keyword from the first mode to a second mode; or in response to the current editing mode being a third mode, switching the display mode of the keyword from the third mode to a second mode associated with the third mode.

14. The device according to claim 12, wherein the one or more processors are further cause to implement:

displaying a first area in response to an operation on the prompt information, wherein the first area comprises the keyword, the associated information corresponding to the keyword, and an operation prompt related to the associated information.

15. The device according to claim 14, wherein the one or more processors are further cause to implement:

in response to a second operation performed by the user on the first area, establishing a link between the keyword and the associated information.

16. The device according to claim 14, wherein the one or more processors are further cause to implement:

in response to a third operation performed by the user on the first area, inserting the associated information corresponding to the keyword into the current document as edit content.

17. The device according to claim 14, wherein the one or more processors are further cause to implement:

in response to a fourth operation performed by the user on the first area, copying the associated information corresponding to the keyword.

18. A non-transitory storage medium storing a computer program thereon, wherein the computer program, when executed by a processor, implements:

in response to an operation performed by a user on a current document, extracting a keyword from document content of the current document;

determining associated information corresponding to the keyword by performing searching in a preset database based on the keyword; and displaying prompt information, wherein the prompt information is configured to indicate information related to the associated information, wherein the computer program, when executed by a processor, implements:

creating and editing an associated document in response to an operation performed by the user, when no associated information corresponding to the keyword is searched out in the preset database; and determining the associated document as the associated information corresponding to the keyword.

\* \* \* \* \*